(12) United States Patent
Zhan et al.

(10) Patent No.: US 11,548,317 B2
(45) Date of Patent: Jan. 10, 2023

(54) BRAKE ROTOR AND LIGHTWEIGHT WHEEL ASSEMBLY

(71) Applicant: GM GLOBAL TECHNOLOGY OPERATIONS LLC, Detroit, MI (US)

(72) Inventors: Henry Zhan, Shanghai (CN); Jianfeng Wang, Jiangsu (CN); Congjie Wang, Shanghai (CN); Ming Liu, Pudong (CN); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 16/903,928

(22) Filed: Jun. 17, 2020

(65) Prior Publication Data

US 2021/0394554 A1    Dec. 23, 2021

(51) Int. Cl.
| | |
|---|---|
| *F16D 65/12* | (2006.01) |
| *B60B 27/00* | (2006.01) |
| *B60B 3/10* | (2006.01) |
| *B60B 3/00* | (2006.01) |

(52) U.S. Cl.
CPC .......... *B60B 27/0052* (2013.01); *B60B 3/10* (2013.01); *F16D 65/123* (2013.01); *F16D 65/125* (2013.01); *B60B 3/001* (2013.01); *B60B 2360/104* (2013.01); *B60B 2360/106* (2013.01); *B60B 2900/111* (2013.01); *B60B 2900/141* (2013.01); *B60B 2900/572* (2013.01); *F16D 2200/003* (2013.01); *F16D 2200/0013* (2013.01); *F16D 2200/0021* (2013.01)

(58) Field of Classification Search
CPC . B60B 27/0052; B60B 3/10; B60B 2360/104; B60B 2360/106; B60B 2900/111; B60B 2900/141; F16D 65/123–128; F16D 2200/0013; F16D 2200/003; F16D 2200/0021
USPC .............. 188/218 XL, 264 A, 264 AA, 18 A
See application file for complete search history.

(56) References Cited

U.S. PATENT DOCUMENTS

| | | | | |
|---|---|---|---|---|
| 5,988,761 A | * | 11/1999 | Visser | F16D 65/123 188/218 XL |
| 6,158,124 A | * | 12/2000 | Austin | B23P 11/00 451/63 |
| 7,594,568 B2 | * | 9/2009 | Hanna | F16D 65/12 188/218 XL |
| 7,934,777 B1 | * | 5/2011 | Yuhas | B60B 3/16 188/218 XL |
| 8,820,491 B2 | | 9/2014 | Hanna et al. | |
| 9,027,718 B2 | | 5/2015 | Hanna et al. | |
| 9,463,665 B2 | | 10/2016 | Kleber et al. | |
| 10,675,911 B2 | | 6/2020 | Liu et al. | |

(Continued)

FOREIGN PATENT DOCUMENTS

| | | |
|---|---|---|
| DE | 3636120 A1 | 4/1987 |
| DE | 19753116 C1 | 7/1999 |
| DE | 102014106282 A1 | 11/2014 |

*Primary Examiner* — Christopher P Schwartz
(74) *Attorney, Agent, or Firm* — Vivacqua Crane PLLC

(57) ABSTRACT

A brake rotor includes a friction portion, a hat portion axially extending from the friction portion and including a top face that is axially displaced from the friction portion and a side wall that extends from the friction portion to the top face, and a nose portion which extends axially from the top face of the hat portion away from the friction portion.

13 Claims, 9 Drawing Sheets

(56) References Cited

U.S. PATENT DOCUMENTS

| | | | |
|---|---|---|---|
| 2009/0050423 A1* | 2/2009 | Meckel | F16D 65/127 188/218 XL |
| 2011/0089749 A1 | 4/2011 | Kleber et al. | |
| 2014/0035351 A1* | 2/2014 | Schmidt | B60B 27/0047 301/110 |
| 2018/0186178 A1 | 7/2018 | Liu et al. | |
| 2018/0209498 A1* | 7/2018 | Zandbergen | B33Y 10/00 |

* cited by examiner

BRAKE ROTOR AND LIGHTWEIGHT WHEEL ASSEMBLY

FIELD

The present disclosure relates to a brake rotor and lightweight wheel assembly.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Various materials are commonly used on motor vehicles to reduce weight and to increase aesthetic appeal. Galvanic corrosion is a design consideration when mounting wheels to wheel hubs that are often constructed from different materials. Further, these components spend much of their service life in wet conditions, often with road salt, which can promote galvanic corrosion.

SUMMARY

In an exemplary aspect, a brake rotor includes a friction portion, a hat portion axially extending from the friction portion and including a top face that is axially displaced from the friction portion and a side wall that extends from the friction portion to the top face, and a nose portion which extends axially from the top face of the hat portion away from the friction portion.

In another exemplary aspect, the friction portion is made of a first material and the nose portion is made of a second material that is different from the first material.

In another exemplary aspect, the first material is one of cast-iron and steel and the second material is Aluminum.

In another exemplary aspect, the friction portion, the hat portion, and the nose portion are Aluminum.

In another exemplary aspect, the brake rotor further includes a coating on at least a portion of the brake rotor.

In another exemplary aspect, the coating is one of an epoxy coating, an anodized coating, a passivation coating, a conversion coating, a thermal spray coating, and an e-coating.

In another exemplary aspect, the hat portion includes a plurality of drainage slots on a bottom surface that faces toward the friction surface.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
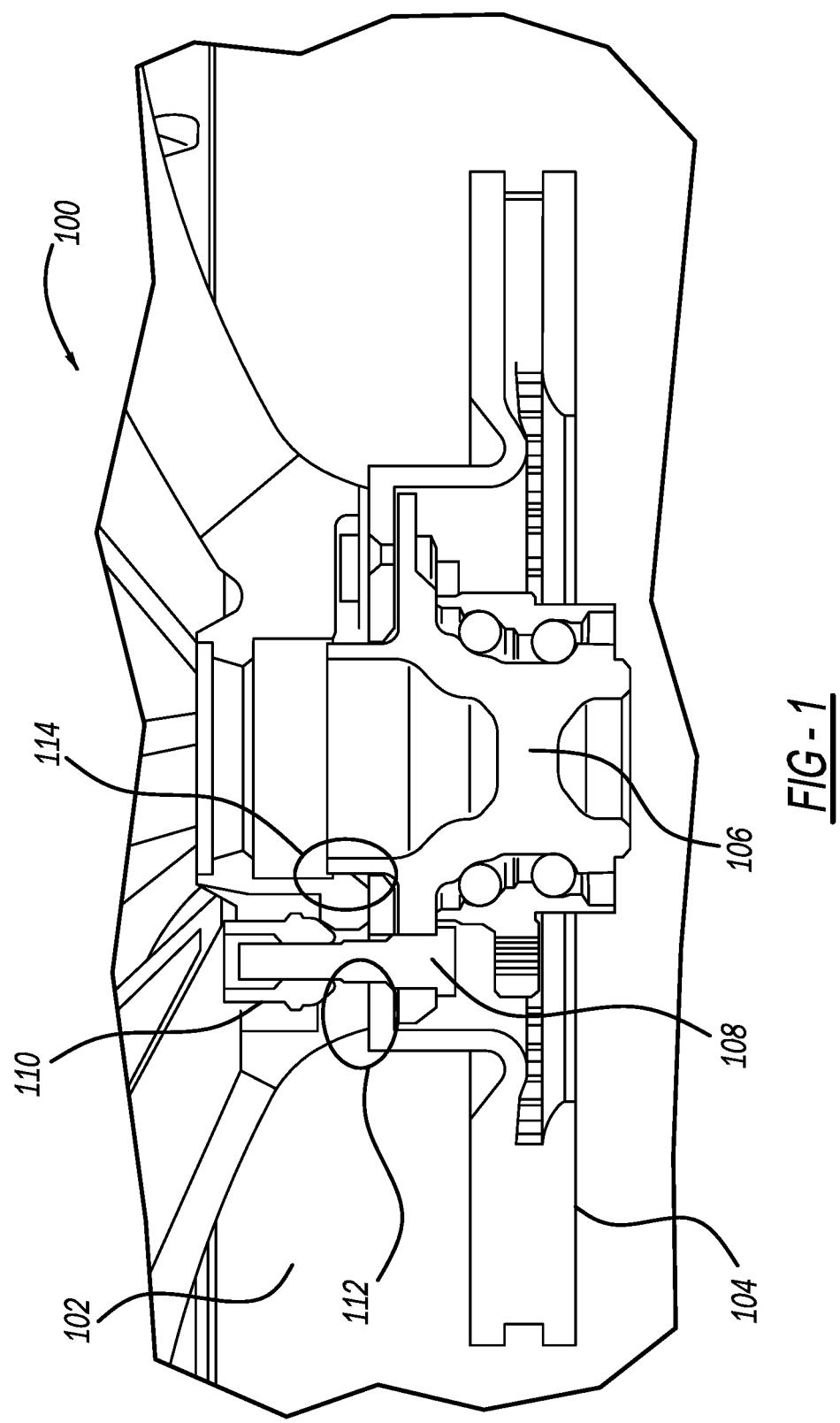
FIG. 1 is a partial cross-sectional view of a wheel assembly.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

FIG. 1 illustrates a partial cross-sectional view of a wheel assembly 100. The wheel assembly 100 includes a wheel 102, a disc brake rotor 104, an axle bearing 106, a wheel stud 108, and a fastener 110. The wheel stud 108 extends through the axle bearing 106, the brake rotor 104, and the wheel 102 and threadably engages with the fastener 110 to capture the brake rotor 104 and the wheel 102 between the axle bearing 106 and the fastener 110. While only a single wheel stud 108 and fastener 110 is illustrated, it is understood that the wheel assembly 100 may include a plurality of wheel studs 108 threadably engaging a corresponding plurality of fasteners 110 to secure the brake rotor 104, and the wheel 102 to the axle bearing 106. A problem may arise with this type of wheel assembly 100 in which galvanic corrosion may occur when various components are made of differing materials and those components come into direct contact with each other. For example, the wheel 102 may be made of a material that includes Magnesium or Aluminum while the axle bearing 106, fastener 110, and brake rotor 104 may each be made from a different material such as, for example a material that includes steel and/or cast iron. FIG. 1 illustrates where the wheel assembly 100 permits contact between the brake rotor 104 and the wheel 102 at 112 and between the axle bearing 106 and the wheel 102 at 114.

Figure 2:
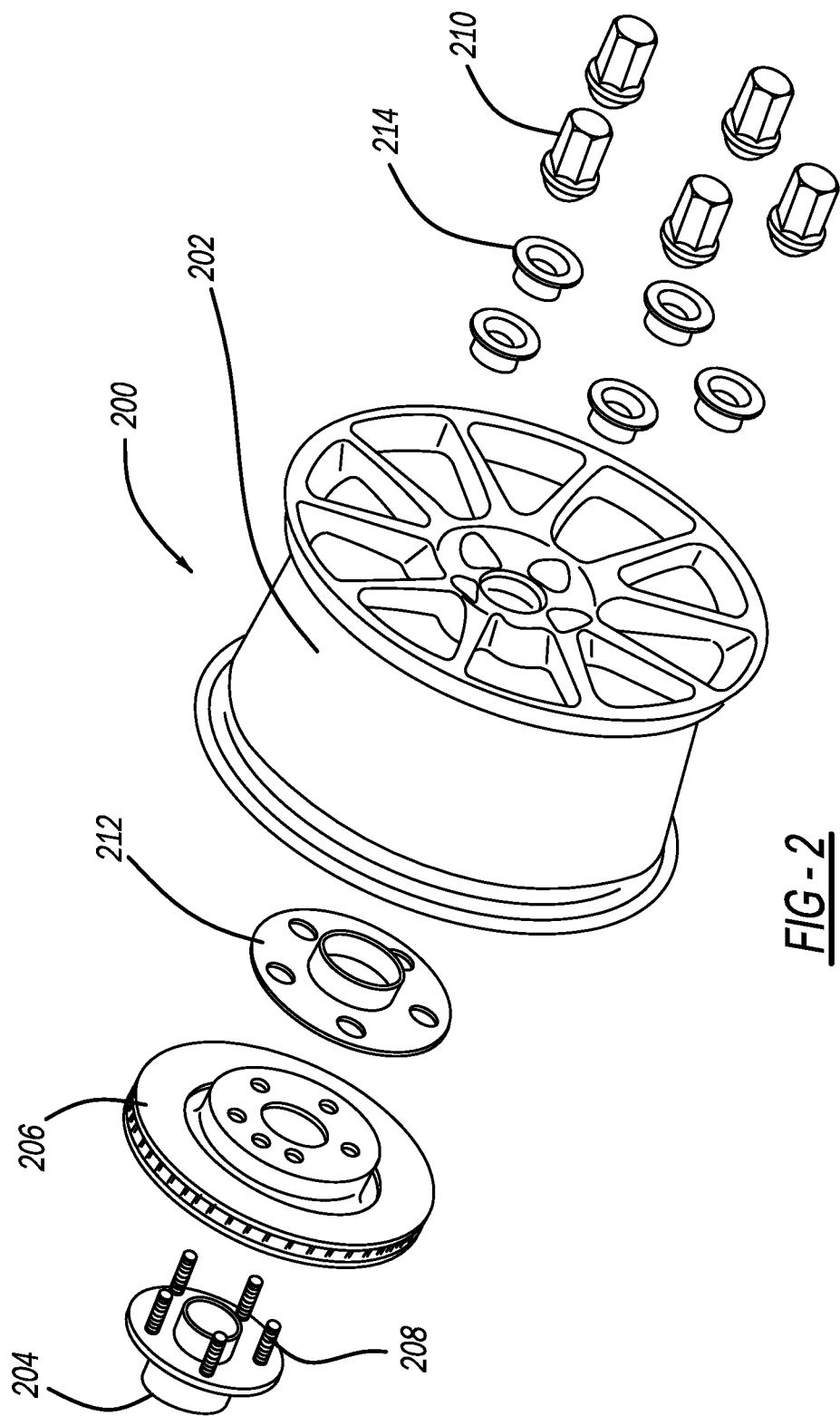
FIG. 2 is an exploded view of another wheel assembly.
Figure 3:
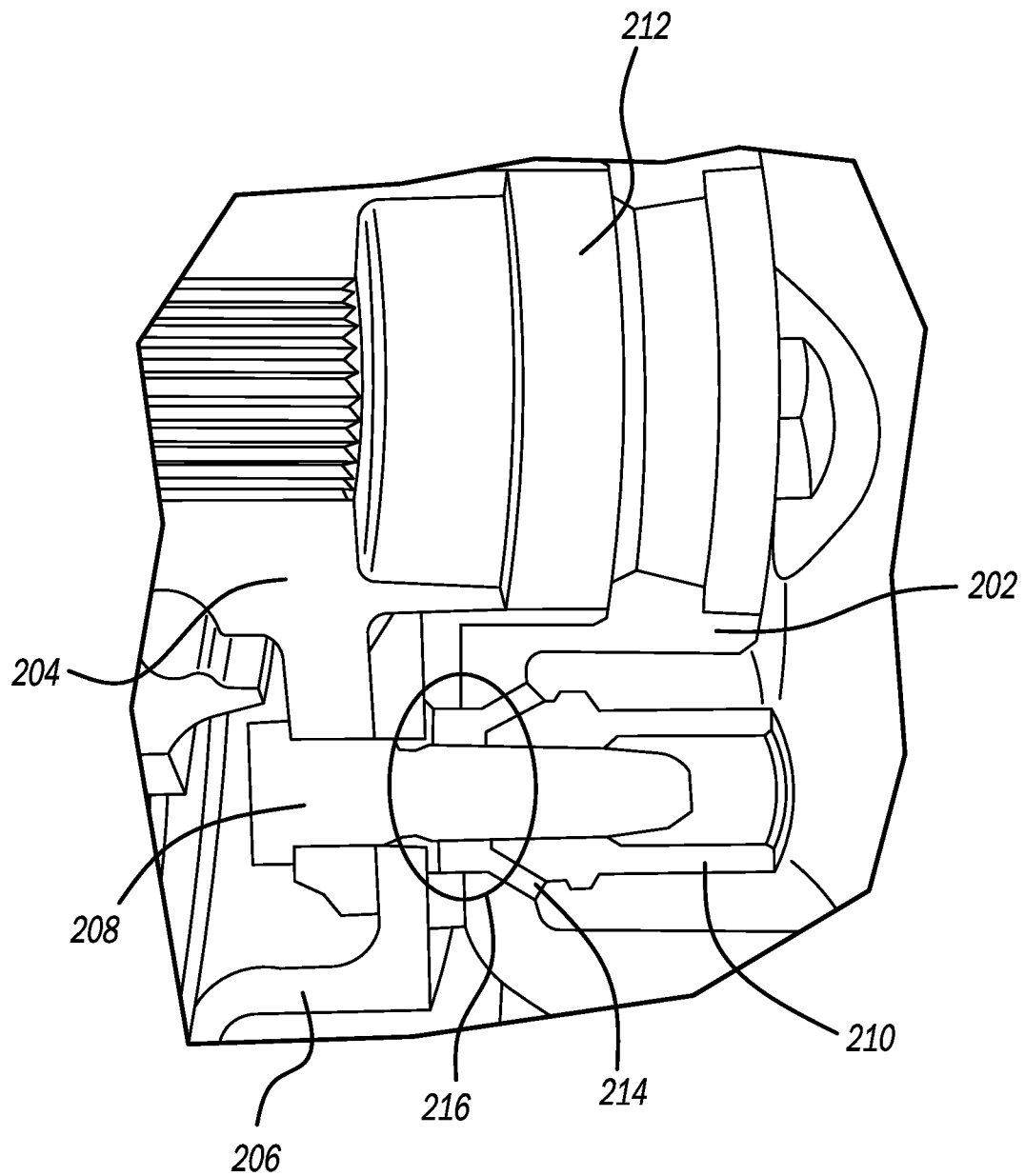
FIG. 3 is close-up, partial cross-sectional view of the wheel assembly of FIG. 2.

One method for addressing this problem is illustrated in FIGS. 2 and 3. FIGS. 2 and 3 illustrate a wheel assembly 200 which includes a wheel 202, an axle bearing 204, a brake rotor 206, wheel studs 208, fasteners 210, a first isolator 212, and a plurality of second isolators 214. FIG. 2 provides an exploded view of the wheel assembly 200 and FIG. 3 provides a close-up, cross-sectional view of a portion of the wheel assembly 200. The wheel assembly 200 may reduce the potential for galvanic corrosion by positioning the first isolator 212 between the brake rotor 206 and the axle bearing 204 on one side and the wheel 202 on the other side, thereby preventing direct contact between the wheel 202 and the axle bearing 204 and/or the brake rotor 206. Further, the wheel assembly 200 may reduce the potential for galvanic corrosion by positioning each of the plurality of second isolators 214 onto corresponding ones of the plurality of wheel studs 208 and between the wheel studs 208 and fasteners 210 on one side and the wheel 202 on the other side. In this manner, the plurality of second isolators 214 prevent direct contact between the wheel 202 and the plurality of wheel studs 208 and the plurality of fasteners 210.

A problem with these wheel assembly configurations 100 and 200 is that they may be difficult to assemble. Further, these wheel assembly configurations require the addition of components to the wheel assembly which increases cost and weight of the overall wheel assembly. Another problem with the wheel assembly configuration 200 is that each of the second plurality of isolators 214 may be press fit into the first isolator 212 as illustrated at 216. This interference fit may result in a risk of distortion of the first isolator 212 which is undesirable.

Figures 4, 5:
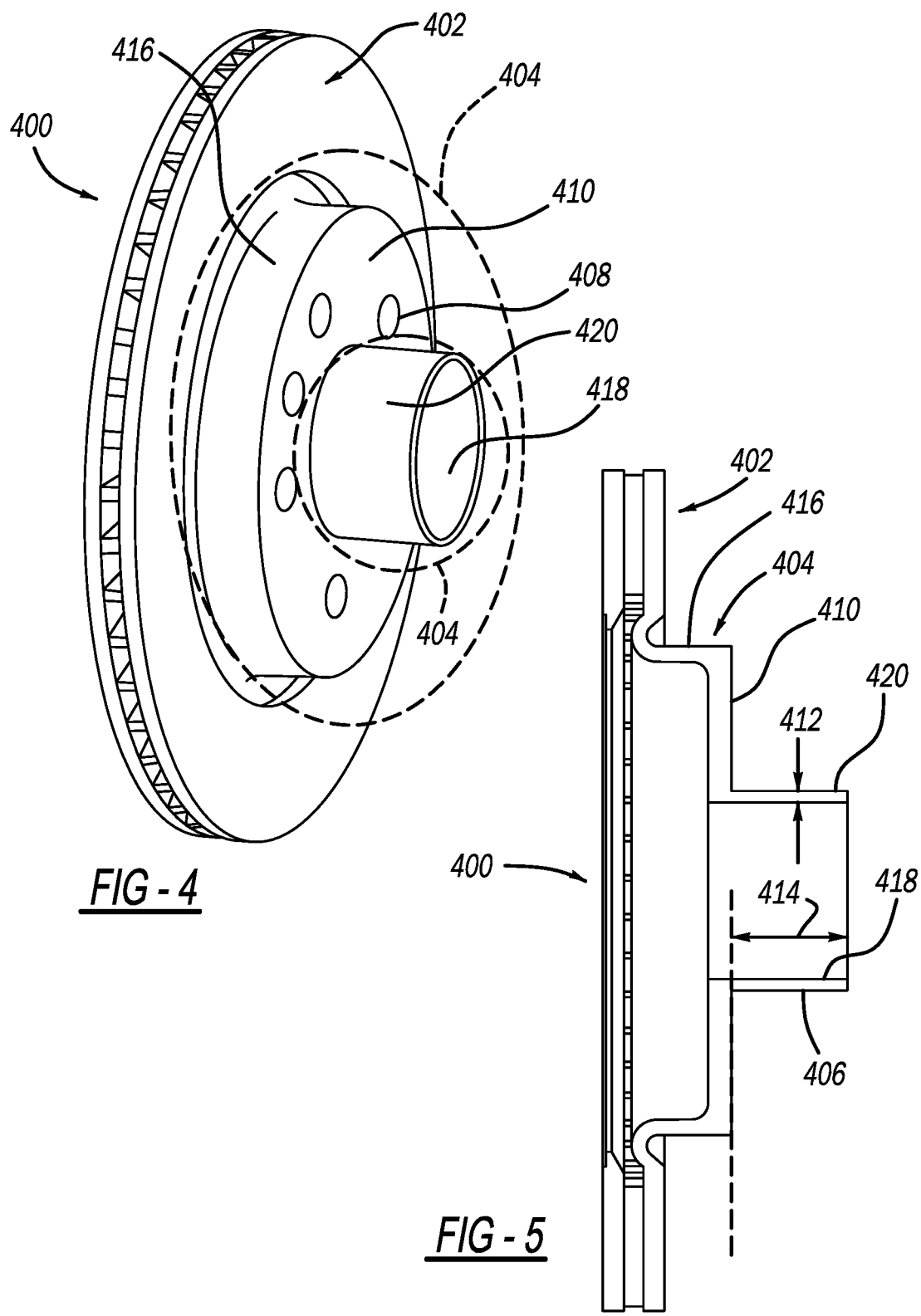
FIG. 4 is a perspective view of an exemplary brake rotor in accordance with the present disclosure.
FIG. 5 is a cross-sectional view of the brake rotor of FIG. 4.

FIGS. 4 and 5 illustrate one exemplary embodiment of a brake rotor 400 in accordance with the present disclosure. The brake rotor 400 includes a friction portion 402, a hat portion 404 and a nose portion 406. The friction portion 402 has an annular disc shape. The hat portion 404 connects to an axle hub or bearing of a rotatable axle of a wheel assembly for a vehicle (not shown) and the friction portion 402 having a pair of mutually opposed braking surfaces onto which brake pads (not shown) are selectively applied when braking is desired. The hat portion 404 includes a top face 410 that is axially displaced from the friction portion 402 and a side wall 416 extending between the top face 410 and the friction portion 402. The nose portion 406 extends axially from the top face 410 away from the friction portion 402. The nose portion 406 is generally cylindrical and includes an inner cylindrical surface 418 that is adapted to receive a correspondingly-sized central projection of an axle bearing or hub and an outer cylindrical surface 420 that is adapted to be received into a correspondingly-sized pilot hole of a wheel. The nose portion 406 together with the other portions of the brake rotor 400 serve to isolate the wheel from the remaining components of the wheel assembly as will be further described. This significantly reduces and/or eliminates the risk of galvanic corrosion, reduces the complexity of the wheel assembly, reduces the overall number of components of the wheel assembly, minimizes cost, and simplifies the assembly process for the wheel assembly which incorporates the features of the present disclosure. In an exemplary embodiment, the brake friction portion 402 of the brake rotor 400 may be composed of, for example, a cast iron, while the hat portion 404 and/or the nose portion 406 may be composed of other materials such as, for example, steel, Aluminum, or other material. These other materials may be selected such that they are less likely to promote galvanic corrosion between the brake rotor 400 and a wheel which may be made of, for example, Aluminum, Magnesium, and/or other materials when mounted in a wheel assembly which includes the brake rotor 400 and where the wheel may come into direct contact with portions of the brake rotor 400. In a preferred embodiment, the hat portion 404 and/or the nose portion 406 may be composed of over 50% Aluminum. In an exemplary aspect of the brake rotor 400 the axial extent 414 of the nose portion 404 is between about 10 and 60 millimeters and the thickness 412 is between about 1 and 3 millimeters.

As will be further described in association with FIGS. 6 and 7, FIGS. 4 and 5 illustrate that the hat portion 404 includes a plurality of pilot holes 408 that are configured to permit studs which extend from an axle bearing to pass through the brake rotor 400 and engage with a plurality of fasteners and to capture a wheel between the fastener and the brake rotor 400. The top face surface 410 of the hat portion 404 will directly contact a surface of a wheel and, in comparison with the wheel assembly 200, will not be at risk of distortion thereby ensuring more precise relative positioning and location of the wheel in the associated wheel assembly.

Figure 6:
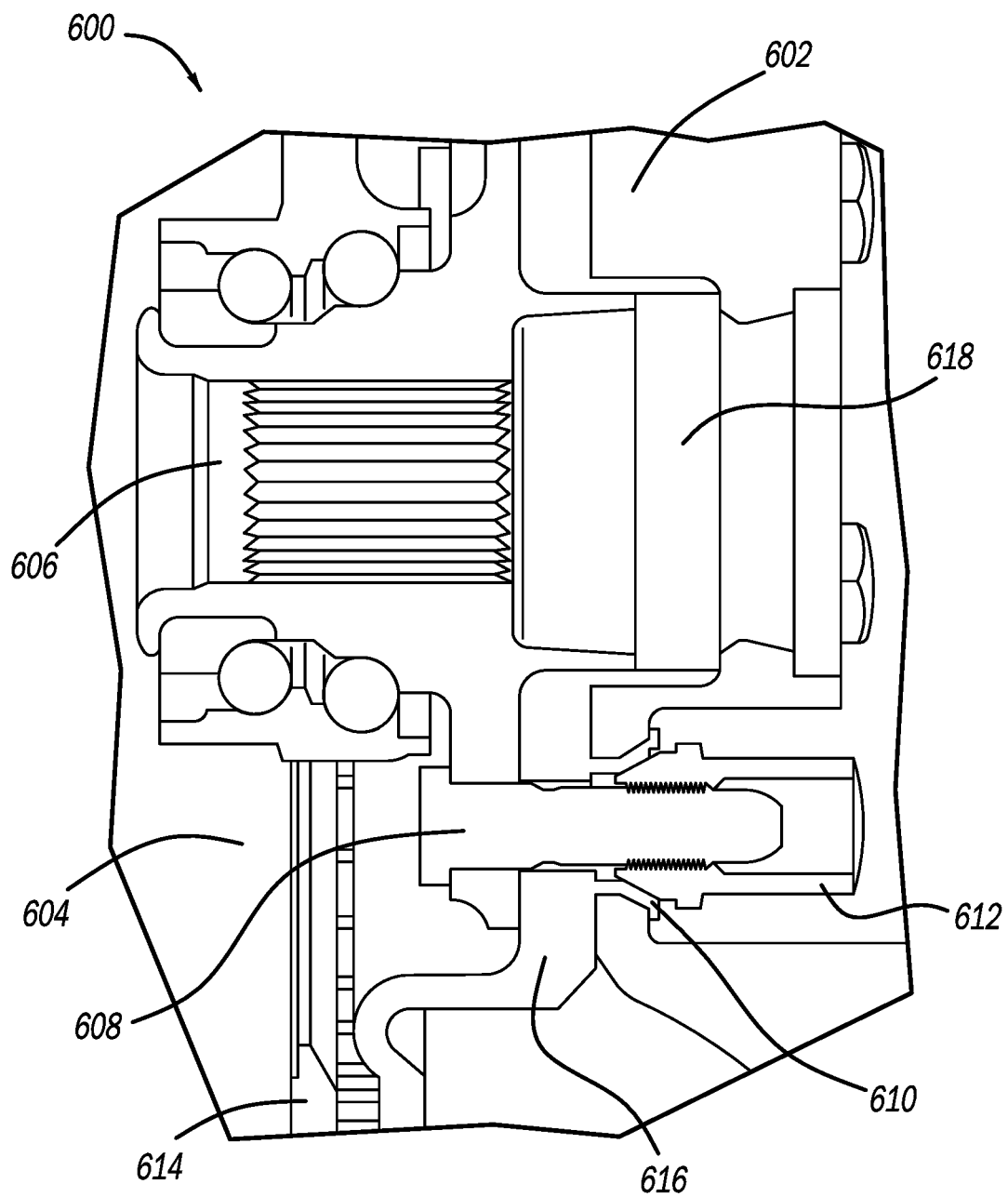
FIG. 6 is a close-up, partial cross-sectional view of an exemplary wheel assembly in accordance with the present disclosure.

FIG. 6 illustrates a wheel assembly 600 in accordance with an exemplary embodiment of the present disclosure. The wheel assembly 600 includes a wheel 602, a brake rotor 604, an axle bearing 606, a wheel stud 608, a bushing 610, and a fastener 612. The brake rotor 604 includes a friction portion 614, a hat portion 616, and a nose portion 618. The brake friction portion 614 of the brake rotor 604 may be composed of one material, for example, a cast iron or steel, while the hat portion 616 and/or the nose portion 618 may be composed of other materials such as, for example, steel, Aluminum, or other material. These other materials may be selected such that they are less likely to promote galvanic corrosion between the brake rotor 604 and the wheel 602 which may be made of, for example, Aluminum, Magnesium, and/or other materials when mounted in the wheel assembly 600 where the wheel 602 comes into direct contact with the hat portion 616 and the nose portion 618 of the brake rotor 604. Further, the bushing 610 may also be composed of other materials such as, for example, steel, Aluminum, or other material. These other materials may be selected such that they are less likely to promote galvanic corrosion between the axle bushing 610 and the wheel 602 which may be made of, for example, Aluminum, Magnesium, and/or other materials when mounted in the wheel assembly 600.

Figure 7:
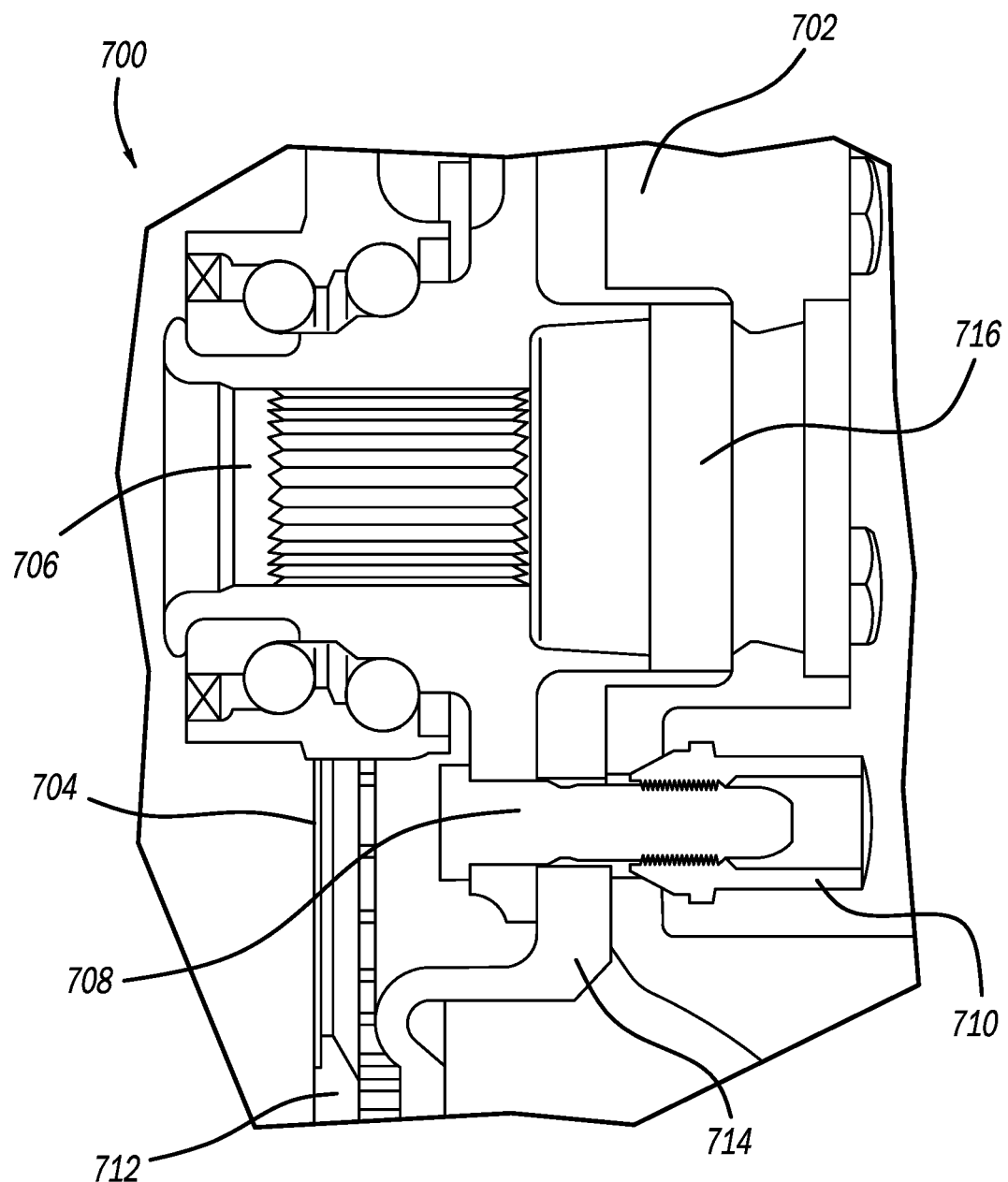
FIG. 7 is a close-up, partial cross-sectional view of another exemplary wheel assembly in accordance with the present disclosure.

FIG. 7 illustrates a wheel assembly 700 in accordance with yet another exemplary embodiment of the present disclosure. The wheel assembly 700 includes a wheel 702, a brake rotor 704, an axle bearing 706, a wheel stud 708, and a fastener 710. The brake rotor 704 includes a friction portion 712, a hat portion 714, and a nose portion 716. Unlike the wheel assembly 600 of FIG. 6, the wheel assembly 700 of FIG. 7 does not include a bushing. The brake friction portion 712 of the brake rotor 704 may be composed of one material, for example, a cast iron or steel, while the hat portion 714 and/or the nose portion 716 may be composed of other materials such as, for example, steel, Aluminum, or other material. These other materials may be selected such that they are less likely to promote galvanic corrosion between the brake rotor 704 and the wheel 702 which may be made of, for example, Aluminum, Magnesium, and/or other materials when mounted in the wheel assembly 700 where the wheel 702 comes into direct contact with the hat portion 714 and the nose portion 716 of the brake rotor 704. In a preferred embodiment, the fastener 710 may be composed of an Aluminum material to further minimize the risk of galvanic corrosion. Alternatively, the entire brake rotor 704 may be made from Aluminum.

Figure 8:
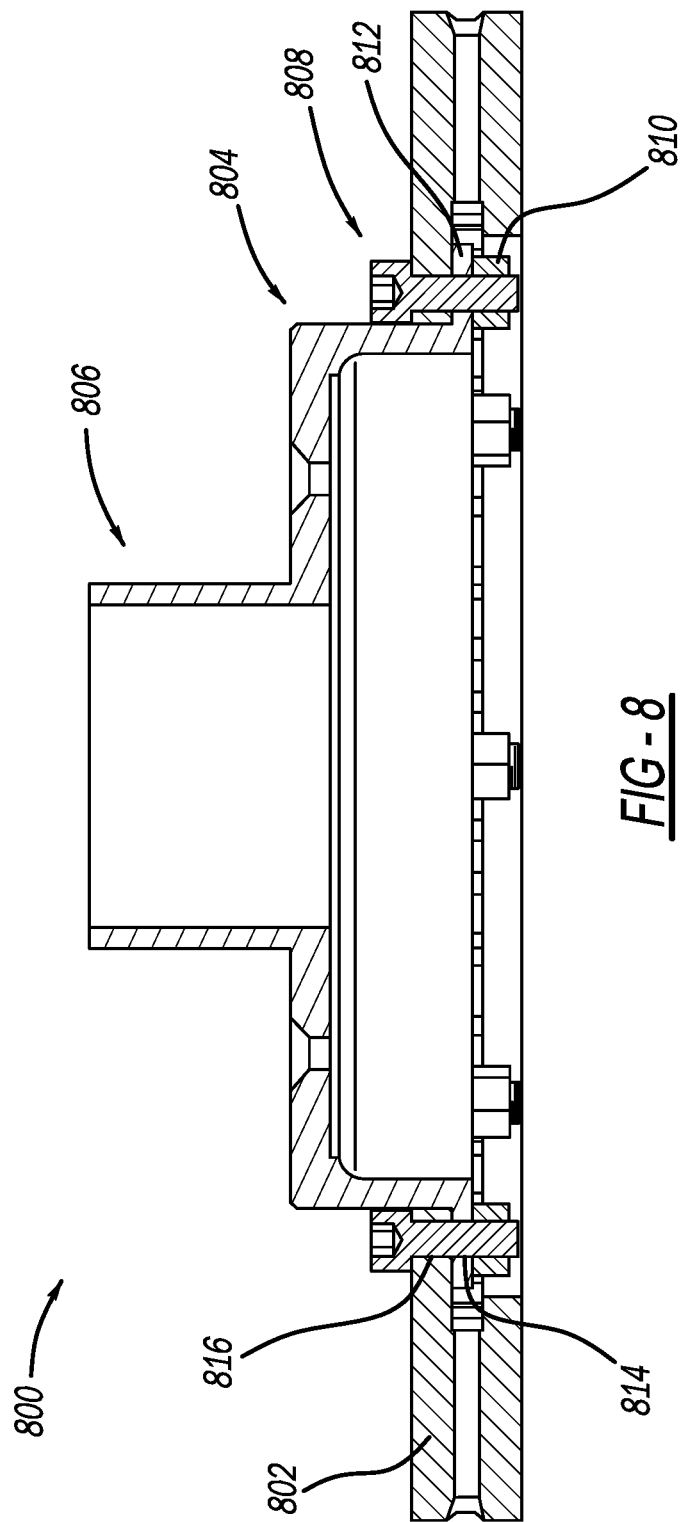
FIG. 8 is a cross-sectional view of another exemplary brake rotor in accordance with the present disclosure.
Figure 9:
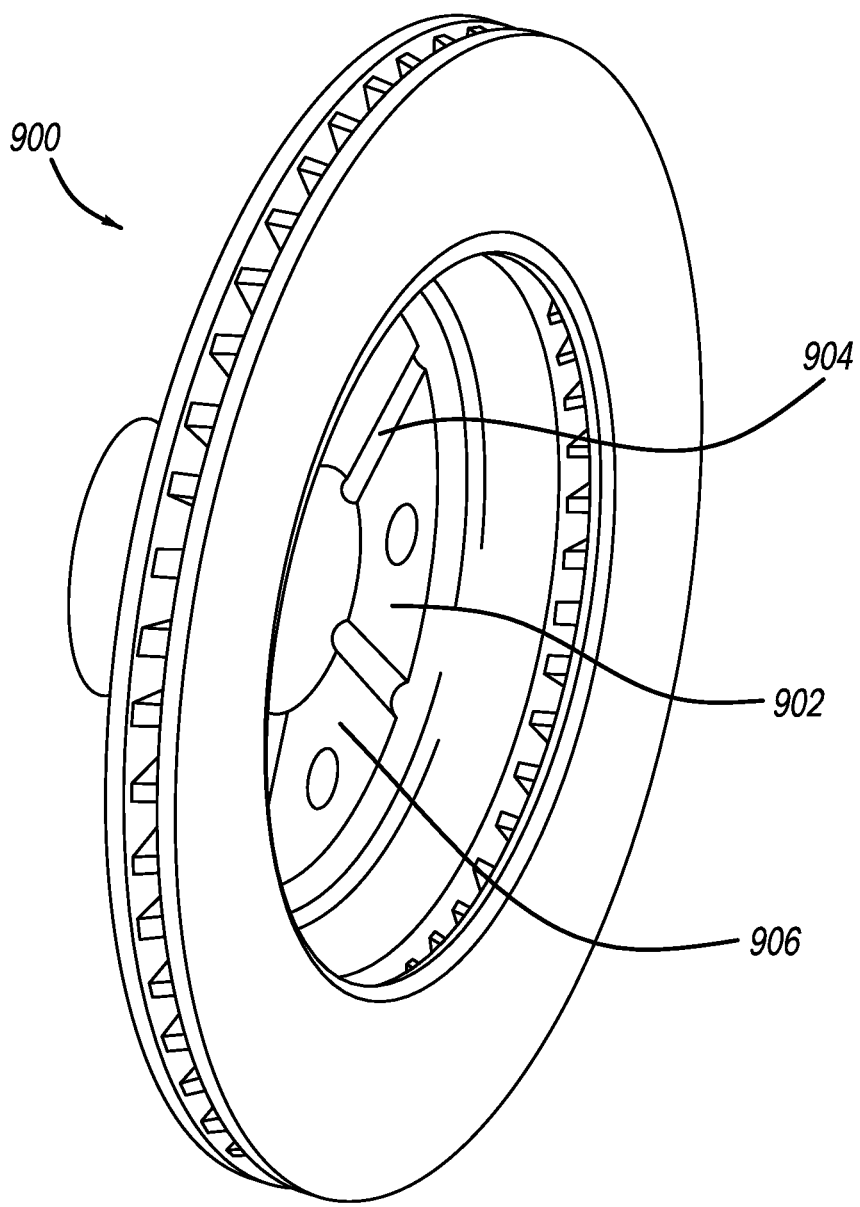
FIG. 9 is a perspective view of yet another brake rotor in accordance with the present disclosure.
Figure 10:
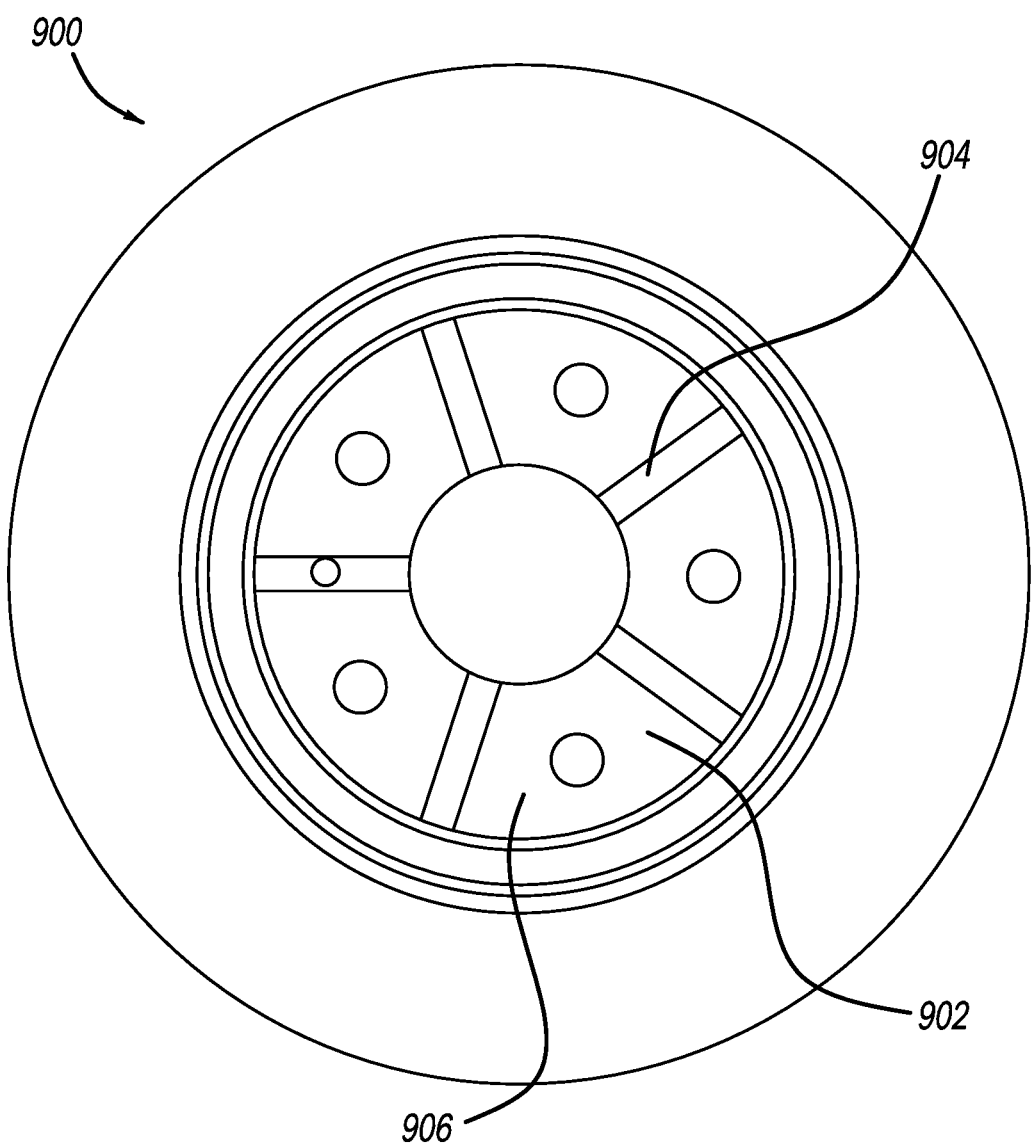
FIG. 10 is a view of the brake rotor of FIG. 9.

FIG. 8 illustrates a brake rotor 800 in accordance with an exemplary embodiment of the present disclosure. A brake rotor in accordance with the present disclosure may be composed of multiple materials. For example, a brake rotor may have a material which is best suited for use in a friction portion of the brake rotor while also including a hat portion and a nose portion which may be made of different materials which may be selected to have reduced risk of galvanic corrosion when included in a wheel assembly having a wheel that is composed of other materials. FIG. 8 merely illustrates one exemplary embodiment of a brake rotor 800 which is constructed to have different portions being composed of different materials and is not intended to limit the present disclosure to any particular brake rotor construction. The brake rotor 800 includes a friction portion 802, a hat portion 804, and a nose portion 806. The nose portion 806 and the hat portion 804 are integrated into a single part and may be made of the same material. The brake rotor 800 further includes a plurality of bolts 808 and a plurality of nuts 810. The hat portion 804 includes a flange 812 that includes a plurality of first through holes 814 and the friction portion 802 includes a corresponding plurality of second through holes 816. Each of the plurality of bolts 808 extend through the plurality of first through holes 814 and the plurality of second through holes 816 and threadably engages with a corresponding one of the plurality of nuts 810. In this manner, the hat portion 804 is firmly fixed to the friction portion 802 of the brake rotor 800. While FIG. 8 illustrates an exemplary brake rotor 800, it is to be understood that a brake rotor composed of multiple materials and portions may be assembled in any manner, without limitation and remain within the scope of the present disclosure. For example, a bi-metal brake rotor may be manufactured by overcasting methods and the like or by other mechanical fixing configurations without limitation FIGS. 9 and 10 illustrate another exemplary embodiment of a brake rotor 900 in accordance with the present disclosure. The brake rotor 900 includes a hat portion 902 which is configured to come into direct contact with a wheel in a wheel assembly and which also includes a plurality of drainage slots 904 on a bottom surface 906 of the hat portion 902 that will face away from the wheel in the wheel assembly. In other words, the bottom surface 906 faces toward the friction portion of the brake rotor 900. The plurality of drainage slots 904 provide a route for water or other fluids to drain away and out of the wheel assembly and away from the wheel which further reduces the potential for galvanic corrosion by reducing and/or eliminating the moisture at the interface between the brake rotor 900 and a wheel in a wheel assembly which includes the brake rotor 900. In contrast to conventional brake rotors which may also include a plurality of drainage slots which are arranged to direct the flow of fluid toward the wheel of a wheel assembly or conventional wheels which may include the plurality of drainage slots, the brake rotor 900 of the present invention includes a plurality of drainage slots 904 on a bottom surface 906 of the brake rotor 900 which faces away from the wheel in order to direct the flow of fluid away from the wheel of a wheel assembly.

In another exemplary embodiment, a surface of the brake rotor in accordance with the present disclosure which comes into direct contact with a wheel may include a coating such as, for example, an epoxy coating, an anodized coating, a passivation coating, a conversion coating, a thermal spray coating, and an e-coating and/or the like to further reduce and/or eliminate the risk of galvanic corrosion. In a preferred embodiment, the hat section and/or the nose section of the brake rotor may be composed of an Aluminum material which includes an anodized coating.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A brake rotor comprising:
   a friction portion;
   a hat portion axially extending from the friction portion and including a top face that is axially displaced from the friction portion and a side wall that extends from the friction portion to the top face; and
   a nose portion which extends axially from the top face of the hat portion away from the friction portion,
   wherein the hat portion includes a plurality of drainage slots on a bottom surface opposite the top face that faces toward the friction portion.

2. The brake rotor of claim 1, wherein the friction portion is made of a first material and the nose portion is made of a second material that is different from the first material.

3. The brake rotor of claim 2, wherein the first material comprises one of cast-iron and steel and the second material comprises Aluminum.

4. The brake rotor of claim 1, wherein the friction portion, the hat portion, and the nose portion comprise Aluminum.

5. The brake rotor of claim 1, further comprising a coating on at least a portion of the brake rotor.

6. The brake rotor of claim 5, wherein the coating comprises one of an epoxy coating, an anodized coating, a passivation coating, a conversion coating, a thermal spray coating, and an e-coating.

7. A wheel assembly comprising:
   a wheel including a first plurality of through holes;
   an axle bearing including a second plurality of through holes;
   a plurality of fasteners;
   a brake rotor including:
      a friction portion;
      a hat portion axially extending from the friction portion and including a top face that is axially displaced from the friction portion and a side wall that extends from the friction portion to the top face, wherein the top portion includes a third plurality of through holes; and
      a nose portion which extends axially from the top face of the hat portion away from the friction portion; and
   a plurality of wheel studs each extending successively through a corresponding one of the second plurality of through holes in the axle bearing; a corresponding one of the third plurality of through holes in the brake rotor, a corresponding one of the first plurality of through holes in the wheel, and threadably engaging a corresponding one of the plurality of fasteners,
   wherein the hat portion includes a plurality of drainage slots on a bottom surface disposed opposite the top face that faces toward the friction portion and is configured to direct a fluid away from the wheel.

8. The wheel assembly of claim 7, wherein the friction portion is made of a first material and the nose portion is made of a second material that is different from the first material.

9. The wheel assembly of claim 8, wherein the first material comprises one of cast-iron and steel and the second material comprises Aluminum.

10. The wheel assembly of claim 7, further comprising a plurality of bushings, wherein the plurality of wheel studs each extend successively through a corresponding one of the second plurality of through holes in the axle bearing; a corresponding one of the third plurality of through holes in the brake rotor, a corresponding one of the first plurality of through holes in the wheel, a corresponding one of the plurality of bushings, and threadably engage a corresponding one of the plurality of fasteners.

11. The wheel assembly of claim 8, wherein the friction portion, the hat portion, and the nose portion comprise Aluminum.

12. The wheel assembly of claim 7, wherein the wheel comprises at least one of Aluminum and Magnesium.

13. The wheel assembly of claim 7, wherein the nose portion comprises an inner cylindrical surface that receives a correspondingly-sized central projection of the axle bearing and an outer cylindrical surface that is received into a correspondingly-sized pilot hole of the wheel.

\* \* \* \* \*